United States Patent
Hernandez et al.

(10) Patent No.: US 9,628,357 B2
(45) Date of Patent: *Apr. 18, 2017

(54) SERVICE COMPLIANCE ENFORCEMENT USING USER ACTIVITY MONITORING AND WORK REQUEST VERIFICATION

(71) Applicant: International Business Machines Corporation, Armonk, NY (US)

(72) Inventors: Milton H. Hernandez, Tenafly, NJ (US); Jim A. Laredo, Katonah, NY (US); Mattias Marder, Haifa (IL); Yaoping Ruan, White Plains, NY (US); Nandagopal Seshagiri, Jalan Damai (SG)

(73) Assignee: International Business Machines Corporation, Armonk, NY (US)

( * ) Notice: Subject to any disclaimer, the term of this patent is extended or adjusted under 35 U.S.C. 154(b) by 353 days.

This patent is subject to a terminal disclaimer.

(21) Appl. No.: 13/951,191

(22) Filed: Jul. 25, 2013

(65) Prior Publication Data
US 2013/0311653 A1 Nov. 21, 2013

Related U.S. Application Data

(63) Continuation of application No. 13/860,322, filed on Apr. 10, 2013.
(Continued)

(51) Int. Cl.
*G06F 15/173* (2006.01)
*H04L 12/26* (2006.01)
(Continued)

(52) U.S. Cl.
CPC ............ *H04L 43/08* (2013.01); *H04L 41/069* (2013.01); *H04L 41/0686* (2013.01);
(Continued)

(58) Field of Classification Search
None
See application file for complete search history.

(56) References Cited

U.S. PATENT DOCUMENTS 7,941,849 B2 * 5/2011 Ting .................... H04L 63/0861
726/22
2003/0120729 A1 6/2003 Kim
(Continued)

FOREIGN PATENT DOCUMENTS

| CN | 1567221 A | 1/2005 |
|---|---|---|
| CN | 101000544 A | 7/2007 |
| CN | 101685451 A | 3/2010 |

OTHER PUBLICATIONS

Office Action, dated Sep. 4, 2015, regarding U.S. Appl. No. 13/860,322, 25 pages.
(Continued)

*Primary Examiner* — Umar Cheema
*Assistant Examiner* — Anh Nguyen
(74) *Attorney, Agent, or Firm* — Yee & Associates, P.C.; Louis J. Percello

(57) ABSTRACT

A computer implemented method, data processing system, and computer program product control point in time access to a remote client device and auditing system logs of the remote client device by an auditing server device to determine whether monitored user activity on the remote client device associated with a work request was in compliance with one or more regulations.

14 Claims, 11 Drawing Sheets

Related U.S. Application Data

(60) Provisional application No. 61/623,990, filed on Apr. 13, 2012.

(51) Int. Cl.
*H04L 29/08* (2006.01)
*H04L 12/24* (2006.01)
*H04L 29/06* (2006.01)

(52) U.S. Cl.
CPC ...... *H04L 41/5061* (2013.01); *H04L 63/1408* (2013.01); *H04L 63/20* (2013.01); *H04L 67/22* (2013.01)

(56) References Cited

U.S. PATENT DOCUMENTS

| | | | |
|---|---|---|---|
| 2005/0086255 A1 | 4/2005 | Schran et al. | |
| 2005/0102173 A1* | 5/2005 | Barker | G06Q 10/063 705/7.26 |
| 2005/0256956 A1* | 11/2005 | Littlefield | G06Q 10/06 709/225 |
| 2005/0278535 A1* | 12/2005 | Fortune | G06F 8/61 713/176 |
| 2008/0086700 A1* | 4/2008 | Rodriguez | G06F 9/4443 715/804 |
| 2008/0201326 A1* | 8/2008 | Cotter | G06F 17/30864 |
| 2009/0199106 A1* | 8/2009 | Jonsson | G06F 17/30884 715/744 |
| 2010/0174774 A1 | 7/2010 | Kern et al. | |
| 2010/0296730 A1* | 11/2010 | Matsuoka | H04N 1/4092 382/166 |
| 2011/0191855 A1 | 8/2011 | de Keukelaere et al. | |
| 2013/0198827 A1 | 8/2013 | Bhaskaran et al. | |
| 2013/0275579 A1 | 10/2013 | Hernandez et al. | |
| 2014/0074629 A1* | 3/2014 | Rathod | G06Q 10/10 705/14.73 |
| 2014/0129942 A1 | 5/2014 | Rathod | |

OTHER PUBLICATIONS

Final Office Action, dated Dec. 16, 2015, regarding U.S. Appl. No. 13/860,322, 18 pages.
Office Action, dated Apr. 5, 2016, regarding U.S. Appl. No. 13/860,322, 25 pages.
Final Office Action, dated Jun. 29, 2016, regarding U.S. Appl. No. 13/860,322, 15 pages.
Notice of Allowance, dated Nov. 18, 2016, regarding U.S. Appl. No. 13/860,322, 15 pages.

* cited by examiner

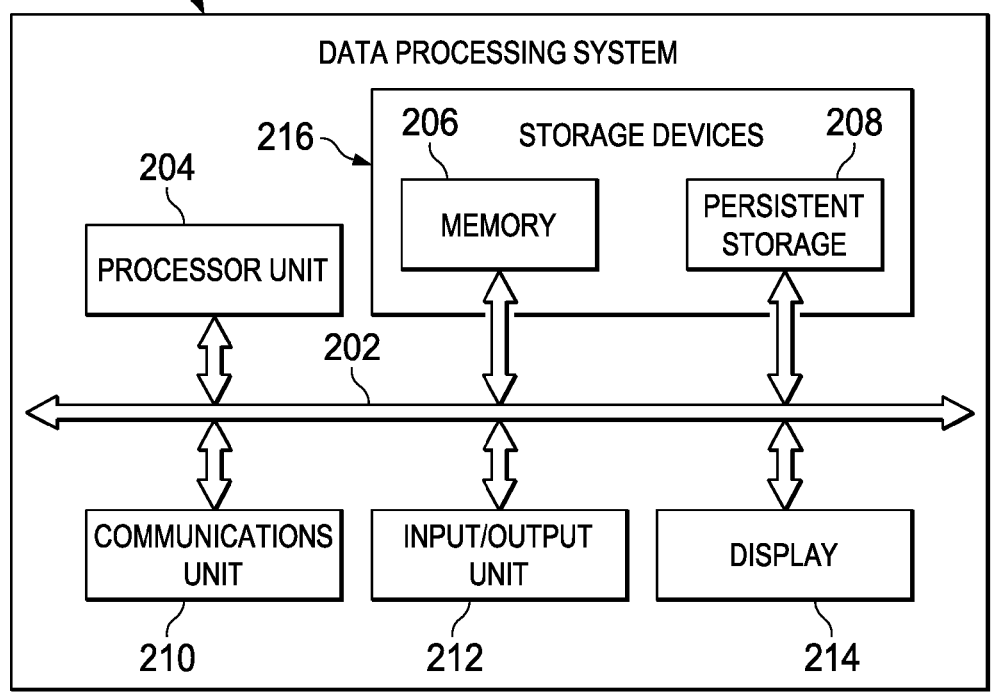
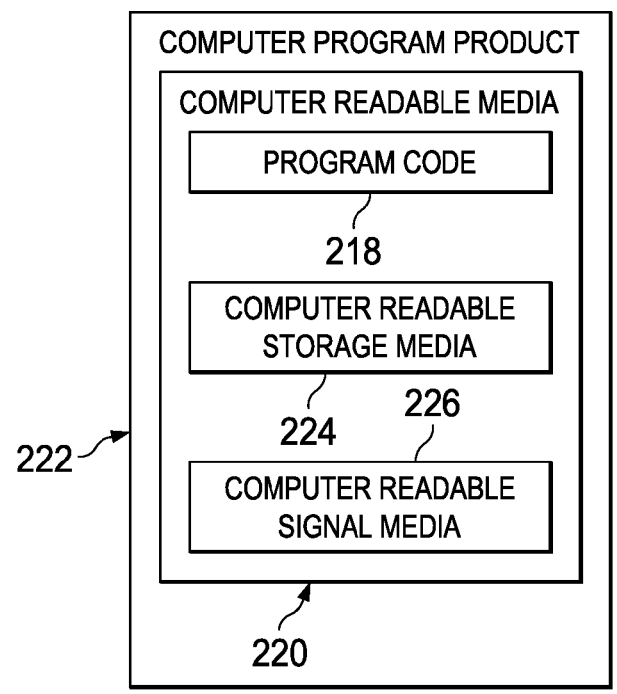
FIG. 2

SERVICE COMPLIANCE ENFORCEMENT USING USER ACTIVITY MONITORING AND WORK REQUEST VERIFICATION

This application is a continuation of U.S. application Ser. No. 13/860,322, filed Apr. 10, 2013, which claims the benefit of U.S. Provisional Application No. 61/623,990, filed Apr. 13, 2012, the entirety of which is incorporated by reference herein.

BACKGROUND

1. Field

The disclosure relates to a computer implemented method, data processing system, and computer program product for realtime capturing and monitoring of remote activities using a client-side identification management agent.

2. Description of the Related Art

Network security is becoming more and more important as businesses, governmental agencies, medical institutions, financial institutions, and educational institutions spend more and more time connected online to provide services to individuals. Network security consists of provisions, policies, regulations, and laws designed to prevent and monitor unauthorized access, misuse, or modification of network-accessible resources. Network security is the authorization of access to resources within a network. Typically, users are assigned an identification (identifiers), such as a user name, and a password that allows the users access to the network-accessible resources on a network within their security level clearance. In other words, network security secures the network by protecting and monitoring operations being performed on network-accessible resources.

SUMMARY

The illustrative embodiments herein provide a system for user activity capturing and monitoring services. The invention has a server-client architecture. The client side consists of an agent which performs single sign-on actions for corresponding applications, and a few monitoring modules which captures user activity and transfer activity data to the server component. Each application workflow, determines the right interface and right step to perform single sign-on, and calls individual monitoring modules to perform monitoring actions based on the nature of the application. Activities such as user login, logout, all keystroke, mouse click, and server response are captured and monitored. Each activity monitored by the modules is also logged in the database with each session differentiated by a session identifiers.

For console access such as Secure Shell, multiple Secure Shell sessions or nested Secure Shell sessions can be differentiated.

For graphical user interface applications, such as Tool for Oracle Application Developers (TOAD) for database access, Remote Desktop Protocol for remote Windows server access, activity logs are linked with window title, keystrokes, mouse clicks and critical screenshots. This is achieved via an event-driven snapshot taking mechanism which ensures high performance and low storage size. The resulted log is also searchable via title or command text.

BRIEF DESCRIPTION OF THE SEVERAL VIEWS OF THE DRAWINGS

FIG. 2 is a diagram of a data processing system depicted in accordance with an illustrative embodiment;

DETAILED DESCRIPTION

Figure 1:
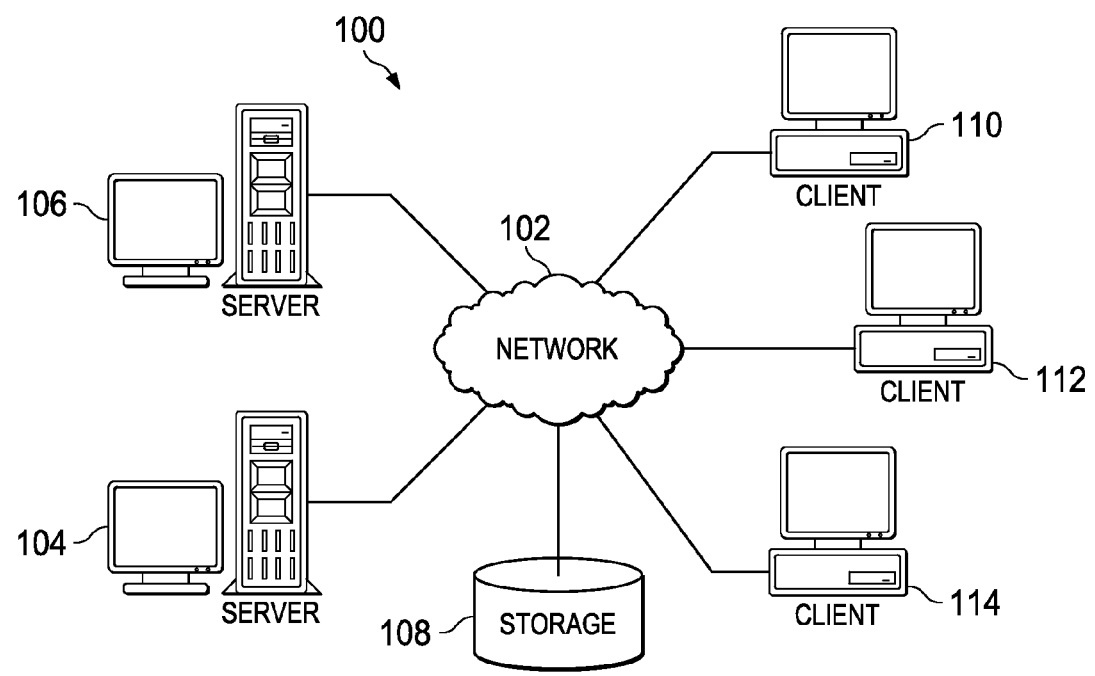
FIG. 1 is a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
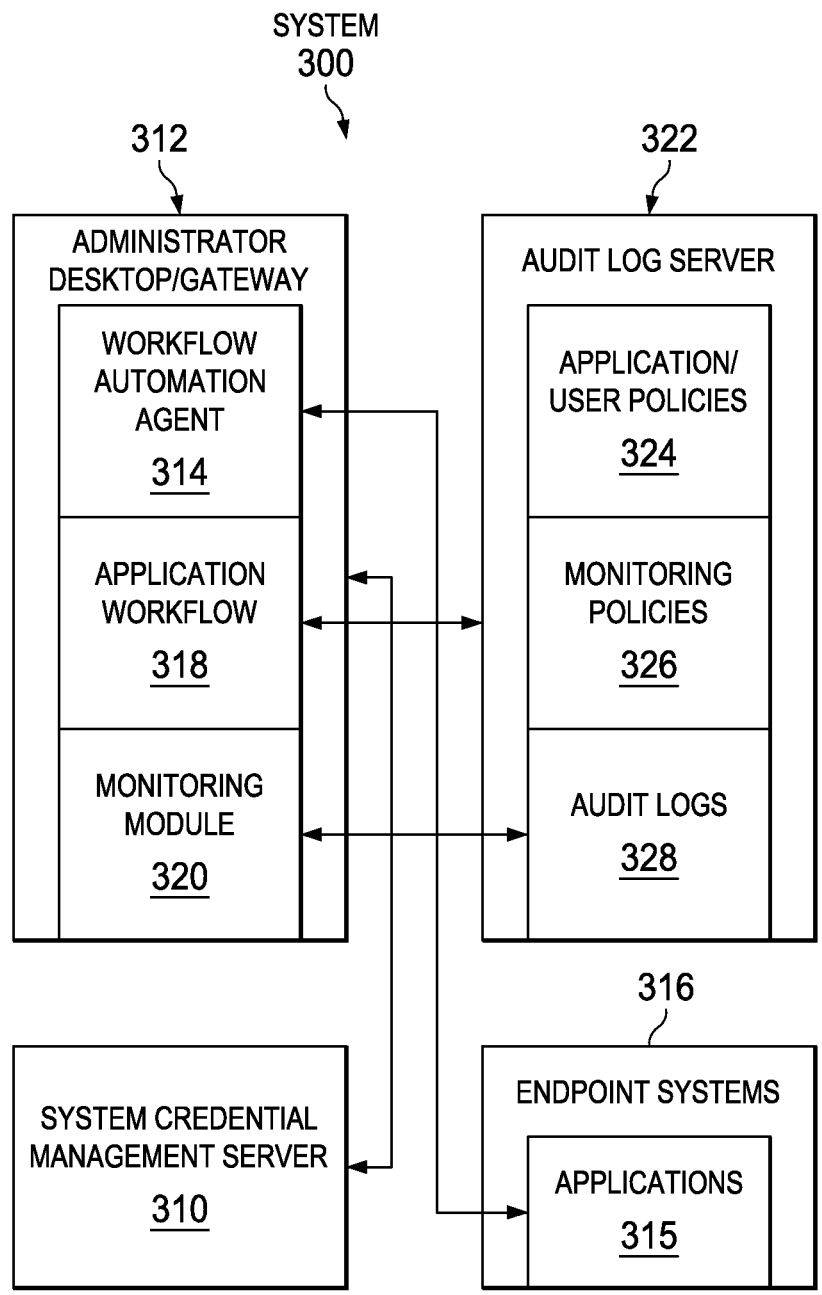
FIG. 3 is an information technology delivery system depicted in accordance with an illustrative embodiment.

With reference now to the figures, and in particular, with reference to FIGS. 1-3, diagrams of data processing environments are provided in which illustrative embodiments may be implemented. It should be appreciated that the Figures are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 may be, for example, an auditing server device that illustrative embodiments use to audit system audit logs of remote client devices to determine whether monitored user activity on the remote client device associated with a work request was in compliance with one or more regulations. A work request is a work order or work instruction that typically is or includes incident, problem, or change ticket information regarding the remote client device. The work request may either be automatically generated by the remote client device, itself, or may be manually generated by a user of the remote client device. The work request is used to have an identified problem corrected on the remote client device by an end user on an end user workstation device via network 102. A regulation may be, for example, a federal regulation provided by FFIEC, HIPAA, or RTIA. FFIEC is the Federal Financial Institutions Examination Council. FFIEC is a formal interagency body of the United States government empowered to prescribe uniform principles, standards, and report forms for the federal examination of financial institutions. HIPAA is the Health Insurance Portability and Accountability Act enacted by the United States, which addresses the security and privacy of healthcare data. RTIA is the Right to Information Act enacted by the Parliament of India, which allows access to access to government documents and information.

Server 106 may be, for example, a system log management server device that receives audit logs from a plurality of remote client devices. The audit logs of the remote client devices include the end user workstation device activities performed on the remote client devices to correct the problems associated with the work requests. In addition, the system log management server device may store the audit logs in the form of audit log reports for each of the plurality of remote client devices. Further, server 104 and server 106 may each represent a plurality of server devices.

Storage unit 108 is a network storage device capable of storing data in a structured or unstructured format. The data stored in storage unit 108 may be data of any type. Storage unit 108 may be, for example, an activity logging database system that stores work request information received from a plurality of remote client devices.

Clients 110, 112, and 114 also connect to network 102. Client computers 110, 112, and 114 may be, for example, network server devices that provide IT services, such as financial services or medical services, to individuals connected to network 102. The financial service may be regulated by FFIEC regulations and the medical service may be regulated by HIPAA regulations, for example. However, it should be noted that client computers 110, 112, and 114 may provide other types of IT services that may be regulated by other types of regulations. A regulated IT service is a service that is not available for unrestricted network access. For example, a medical services application may provide online access to confidential medical history data that is protected under HIPAA regulations. Thus, access to and activities performed on a remote client device that stores this confidential medical data must be monitored and audited to determine whether HIPAA regulations are complied with. An activity or task associated with a work request performed on a remote client device that stores confidential data may be, for example, resetting a password, applying a new security patch, configuring a software application, or testing a hardware component.

In the depicted example, server computer 104 provides information, such as boot files, operating system images, and applications to client computers 110, 112, and 114. Client computers 110, 112, and 114 are clients to server computer 104 and server computer 106. Also, network data processing system 100 may include additional server computers, client computers, and other devices not shown.

Program code located in network data processing system 100 may be stored on a computer recordable storage medium and downloaded to a computer or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other data processing systems or devices. In this example, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of nontangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments herein provide a system for user activity capturing and monitoring services. The invention has a server-client architecture. The client side consists of an agent which performs single sign-on actions for corresponding applications, and a few monitoring modules which are exported as dynamic link library application program interfaces. Each application workflow, determines the right interface and right step to perform single sign-on, and calls individual monitoring modules to perform monitoring actions based on the nature of the application. Activities such as user login, logout are logged on server audit log database by default. Each activity monitored by the modules is also logged in the database with each session differentiated by a session identifiers.

Activities such as Secure Shell are captured when the command is entered. A separate session identifiers is assigned to the Secure Shell session to differentiate it from the parent session. So that multiple Secure Shell sessions or nested Secure Shell sessions can be differentiated.

For graphical user interface applications, such as Tool for Oracle Application Developers (TOAD) for database access, Remote Desktop Protocol for remote Windows server access, activity logs are linked with window title, keystrokes, mouse clicks and critical screenshots. This is achieved via an event-driven snapshot taking mechanism which ensures high performance and low storage size. The resulted log is also searchable via title or command text.

Referring now to FIG. 3, an information technology delivery system is shown according to an illustrative embodiment. System 300 is a network data processing system, such as network data processing system 100 of FIG. 1.

System 300 includes integrated management system server 310. Integrated management system server 310 is a server such as one of servers 104 or server 106 of FIG. 1. Integrated management system server 310 is a central repository for user data, user access profiles, identity wallets, and machine profiles. Integrated management system server 310 provides a Web based interface to administrate users and policies.

Integrated management system server 310 provides a central point of administration and control. Integrated management system server 310 enables centralized management of user identities, application specific workflows, and authentication policies. Integrated management system server 310 also provides loss management of authentication tokens, certificate management, and audit management Administrator desktop/gateway 312 includes base agent 314. Base agent 314 is a software component that can identify and notify common problems with applications 315 on endpoint systems 316 that are monitored by base agent 314.

Administrator desktop/gateway 312 includes application workflow/profile 318. Application workflow/profile 318 is a set of instructions that handles workflow automation for supported desktop applications on endpoint systems 316. In one illustrative embodiment, application workflow/profile 318 is constructed as a state engine, consisting of states, triggers, and actions. Application workflow/profile 318 can contain instructions for performing automatic operations for user logon, user logoff, user change or reset password, and other customized activities the application might present. Application workflow/profile 318 might consist of any combination of these activities and more depending on business requirements and users' needs.

In one illustrative embodiment, application workflow/profile 318 is associated with and uniquely mapped to only one application. An application can be an executable file (.EXE) or a web page, each of which is a unique process on endpoint system 316. Application workflow/profile 318 is loaded in runtime and begins its automation workflow when application workflow/profile 318 detects that the relative application is initiated on endpoint system 316.

Administrator desktop/gateway 312 includes monitoring module 320. Monitoring module 320 is one or more software modules that log event messages to audit log server 322. The event messages can be, for example but not limited to, state changes detected by application specific workflow 420 or monitoring workflow 432. Events are provided to server audit log server 322 in audit logs 324.

Audit log server 322 is a server such as one of servers 104 or server 106 of FIG. 1.

Audit log server 322 includes application/user policies 324 and monitoring policies 326. Application/user policies 324 and monitoring policies 326 may define, for example, which user commands are blocked and which user commands are allowed, which user activities are recorded in a system audit log and which user activities are not, and which user activities require immediate action.

Audit log server 322 includes audit logs 328 provided by monitoring module 320. Audit logs 328 are records of user and administration activity, as determined by application specific workflows and monitoring workflow.

Figure 4:
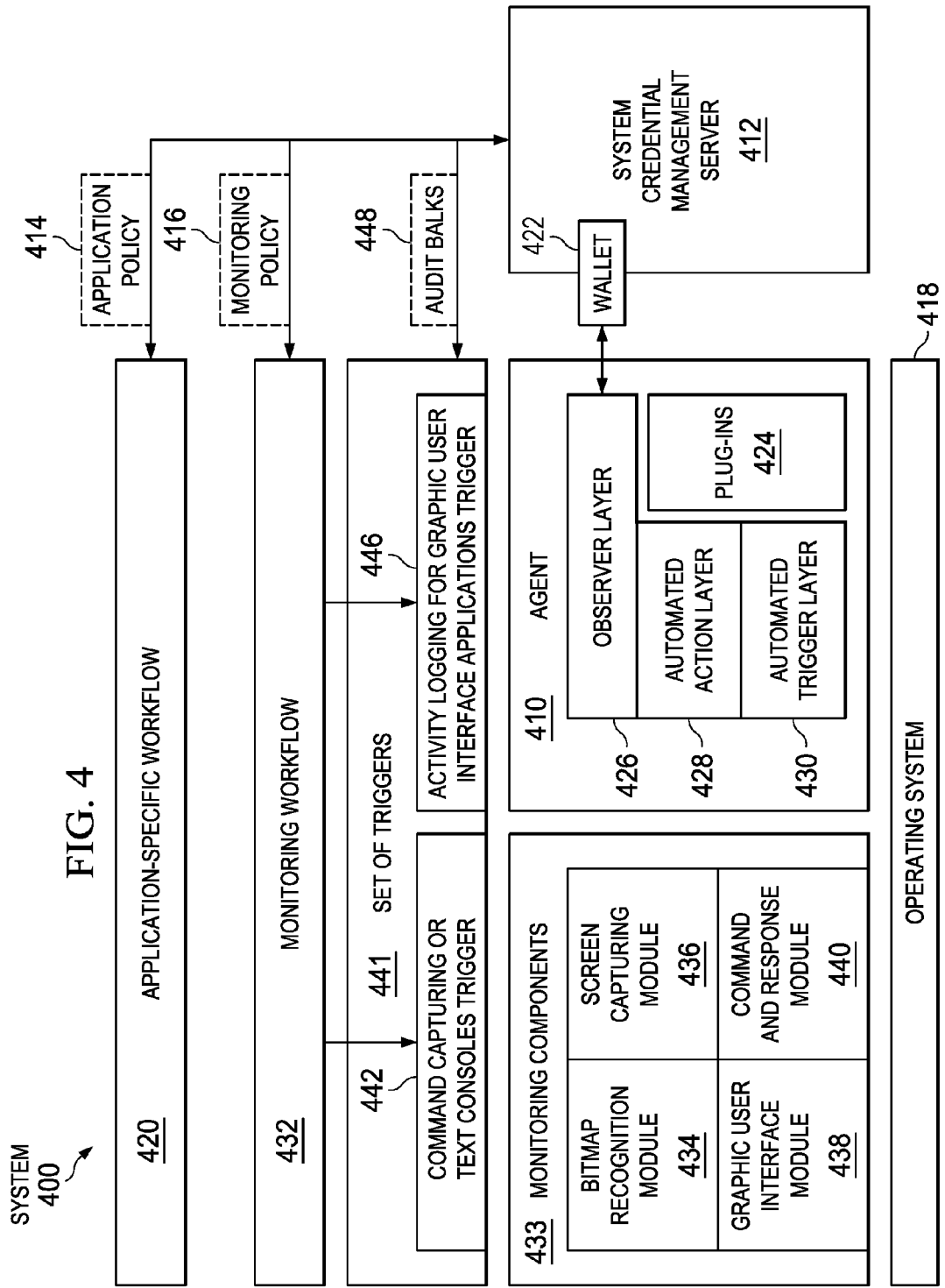
FIG. 4 is an in depth information technology delivery system according to an illustrative embodiment.

Referring now to FIG. 4, an in depth information technology delivery system is shown according to an illustrative embodiment. System 400 is system 300 of FIG. 3.

Agent 410 is a client side software system that communicates with, and performs tasks for, the integrated management system server 412. Communication and tasks can be performed to synchronize data changes with integrated management system server 412. In one illustrative embodiment, agent 410 can cache data locally (on disk) based on policies, such as application policy 414 and monitoring policy 416. Application policy 414 is one or more of application/user policies 324 of FIG. 3. Monitoring policy 416 is one or more of monitoring policies 326 of FIG. 3. As such, agent 410 is able to perform most of its functions even if it is not connected to integrated management system server 412 at any point in time.

Agent 410 is responsible for authenticating a user. Because of its local cache, agent 410 can automate single sign-on into operating system 418 and to a set of applications that are defined in application specific workflow 420. Agent 410 can extend the Windows Graphical Identification and Authentication (GINA) dynamic link library chain to provide additional functions for self-service or strong authentication.

Integrated management system server 412 is integrated management system server 310 of FIG. 3. Integrated management system server 412 is a central repository for user data, user access profiles, identity wallets, and machine profiles. Integrated management system server 412 provides a Web based interface to administrate users and policies.

Integrated management system server 412 provides a central point of administration and control. Integrated management system server 412 enables centralized management of user identities, application specific workflow 420, and authentication policies. Integrated management system server 412 also provides loss management of authentication tokens, certificate management, and audit management.

Wallet 422 holds the user credentials that are required for single sign-on. Wallet 422 is loaded from the integrated management system server 412 into the agent 410 after successful authentication of the user so that wallet 422 is available even when the endpoint is disconnected from the computer network. To protect the credentials against tampering or stealing, wallet 422 is encrypted with a strong encryption mechanism.

Agent 410 includes plug-ins 424. Plug-ins 424 are blocks of code that perform some custom action needed as part of a workflow trigger or workflow action inside application specific workflow 420. In one illustrative embodiment, can be for example but not limited to, VBScript or JavaScript. Using the user's access privileges, plug-ins 424 can make calls into operating system 418, as well as into other ones of plug-ins 424.

Agent 410 typically uses plug-ins 424 to implement customized authentication, access control, or workflow automation for a specific application. This customized authentication, access control, or workflow automation can include, but is not limited to, retrieving application credential from wallet 422, retrieving a user policy setting from wallet 422, looking up a user's group membership or attribute from a user directory, reading or storing data from a central fileshare, looking up the time from the host system clock, performing an additional checksum or check the installation path on a target application prior to single sign-on, calling an external application or process, and making an HTTPS call to a third-party service.

Agent 410 includes observer layer 426. Observer layer 426 is a software component that performs necessary logon/logoff and automation actions into various applications run by system 400. When an application presents a request for credentials, observer layer 426 is responsible for the appropriate action.

In one illustrative embodiment, observer layer 426 is composed of a core module and a number of agent instances that are hooked into various applications. The applications can include, for example but not limited to, for example, IBM Lotus® Notes® application, Microsoft Outlook®, and Microsoft Internet Explorer®. The behavior of the number of agent instances within each application is driven by application specific workflow 420.

Automated trigger layer 428 and automated trigger layer 430 cause transitions between states in application specific workflow 420. Automated trigger layer 428 and automated trigger layer 430 define when a condition is true. For example, automated trigger layer 428 and automated trigger layer 430 can define when a Windows executable window is created, when a Web document completes loading, when an HTML element is clicked, and when an operating system executable button within a graphical user interface is clicked.

Application specific workflow 420 is application/workflow profile 318 of FIG. 3. Application specific workflow 420 is a set of instructions that handles workflow automation for supported applications in operating system 418. In one illustrative embodiment, application specific workflow 420 is constructed as a state engine, consisting of states, triggers, and actions. Application specific workflow 420 can contain instructions for performing automatic operations for user logon, user logoff, user change or reset password, and other customized activities the application might present. Application specific workflow 420 might consist of any combination of these activities and more depending on business requirements and users' needs. In one illustrative embodiment, application specific workflow 420 is an XML-structured file that provides a declarative set of pre-conditions that can be detected by automated trigger layer 428 and automated trigger layer 430 to cause transitions between states in application specific workflow 420.

In one illustrative embodiment, application specific workflow 420 is associated with and uniquely mapped to only one application. An application can be an executable file (.EXE) or a web page, each of which is a unique process on an endpoint system or administrator desktop/gateway. The endpoint system can be, for example, endpoint system 316 of FIG. 3. The administrator desktop/gateway can be, for example, administrator desktop/gateway 312 of FIG. 3.

Application specific workflow 420 is loaded in runtime and begins its automation workflow when application specific workflow 420 detects that the relative application is initiated on an endpoint system or administrator desktop/gateway. The endpoint system can be, for example, endpoint system 316 of FIG. 3. The administrator desktop/gateway can be, for example, administrator desktop/gateway 312 of FIG. 3.

Monitoring workflow 432 is a set of instructions that provide workflow automation applications. Monitoring workflow 432 detects changes to the position or title of the current active window, or a mouse or keyboard event. When such event is detected, monitoring workflow 432 gives a callback to one of set of triggers 441.

Set of triggers 441 can include, for example, command capturing for console access trigger 442. Set of triggers 441 can include, for example, activity logging for bitmapped console trigger 444. Set of triggers 441 can include, for example, activity logging for GUI applications trigger 446.

Monitoring components 433 are software modules, such as for example but not limited to, application programming interface applications that log event messages to integrated management system server 412. The event messages can be, for example but not limited to, state changes detected by application specific workflow 420 or monitoring workflow 432. Events are provided to server 412 in audit logs 448.

Monitoring component 433 can include for example, bitmap recognition module 434. In one illustrative embodiment, the bitmap recognition module 434 comprises an optical character recognition module to capture bit-mapped application processes.

Monitoring component 433 can include for example, screen capturing module 436. In one illustrative embodiment, screen capturing module 436 dynamically captures application screenshots based on user input that causes a state change within either application specific workflow 420 or monitoring workflow 432.

Monitoring component 433 can include for example, graphical user interface module 438. In one illustrative embodiment, graphical user interface module 438 dynamically captures a window title of a current active application as well as any button name that is interacted with in the graphical user interface as an activity signature. In one illustrative embodiment, graphical user interface module 438 can include a trigged when though a window monitoring process to trigger a log on process.

Monitoring component 433 can include for example, command and response module 440. In one illustrative embodiment, command and response module 440 captures user input, such as but not limited to, key strokes and mouse clicks.

Audit logs 448 are records of user and administration activity, as determined by application specific workflow 420 and monitoring workflow 432 that are stored in integrated management system server 412.

Audit logs 448 can provide logs of different activity. For example, audit logs may provide a logged record of user, system, and administrator activities. User and administrator logs track user, administrator, and help desk activity. The user and administrator logs are considered the audit logs, and are written to integrated management system server 412. The system logs are message and error logs for integrated management system server 412 itself, primarily used for troubleshooting server issues and monitoring the system health.

Triggers 441 are software mechanisms that detect an occurrence of an event defined by one of application specific workflow 420 or monitoring workflow 432. In response to detecting the event, triggers 441 then cause the creation of audit log 448.

In one illustrative embodiment, trigger 442 is a command capturing for console access. When a user attempts a log on process, trigger 442 invokes one or more of monitoring components 433.

In one illustrative embodiment, trigger 444 is an activity logger for bitmapped console applications. In response to determining a change by a bitmapped recognition module, trigger 444 invokes one or more of monitoring components 433.

In one illustrative embodiment, trigger 446 is an activity logger for applications' graphical user interfaces. In response to detecting an interaction with an icon or other graphical user interface element, trigger 446 invokes one or more of monitoring components 433.

Figure 5:
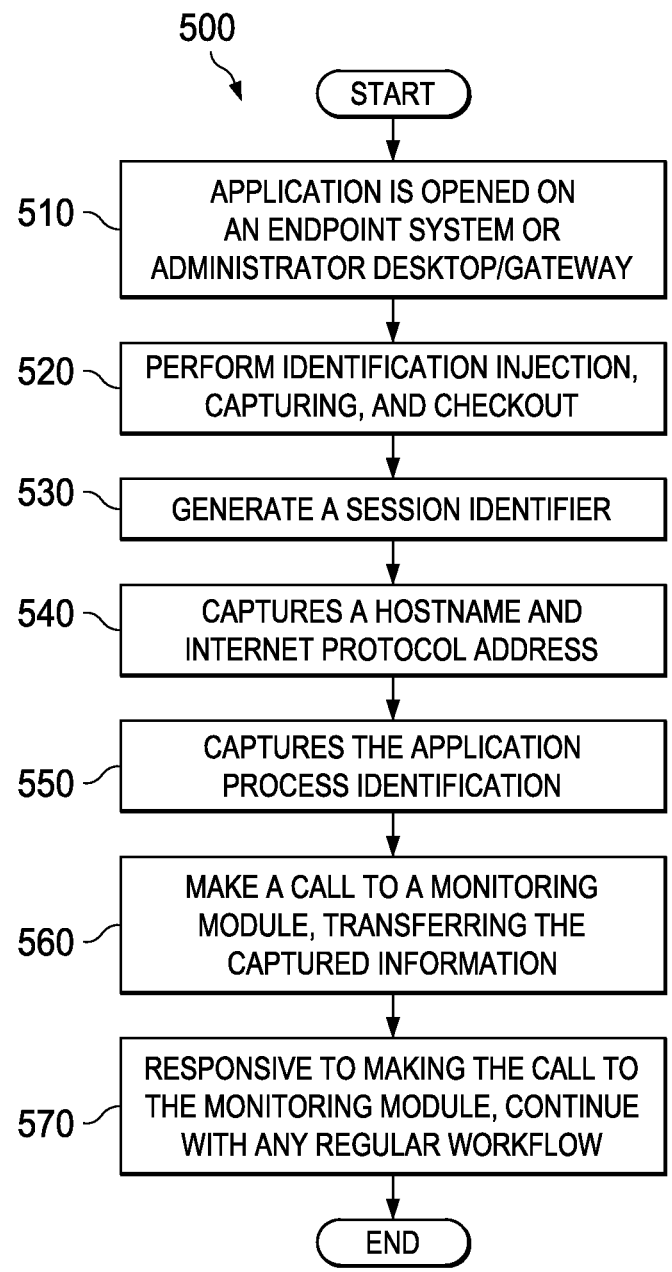
FIG. 5 is a flow chart for command capturing within a profile according to an illustrative embodiment.

Referring now to FIG. 5, a flow chart for command capturing within a profile is shown according to an illustrative embodiment. Process 500 is a software process, executing on a software component, such as application specific workflow 420 of FIG. 4.

Process 500 begins when an application is opened on an endpoint system or administrator desktop/gateway (step 510). The application can be, for example, one of applications 315 of FIG. 3. The endpoint system can be, for example, endpoint system 316 of FIG. 3. The administrator desktop/gateway can be, for example, administrator desktop/gateway 312 of FIG. 3.

Process 500 then performs identification injection, capturing, and checkout (step 520). Identification injection, capturing, and checkout is a process that retrieves any necessary user credentials that are required for access of an application, and applies those credentials to a checkout procedure. The credentials can be stored in a wallet, such as wallet 422 of FIG. 4. Process 500 then generates a session identifier (step 530). The session identifier is a unique identifier that is sent with each request made by the logged on user.

Process 500 then captures a hostname and internet protocol address (step 540).

Process 500 then captures the application process identification (step 550).

Process 500 then makes a call to a monitoring module, transferring the captured information (step 560). The monitoring module can be, for example, monitoring components 433 of FIG. 4.

Responsive to making the call to the monitoring module, process 500 continues with any regular workflow (step 570), with the process terminating thereafter.

Figure 6:
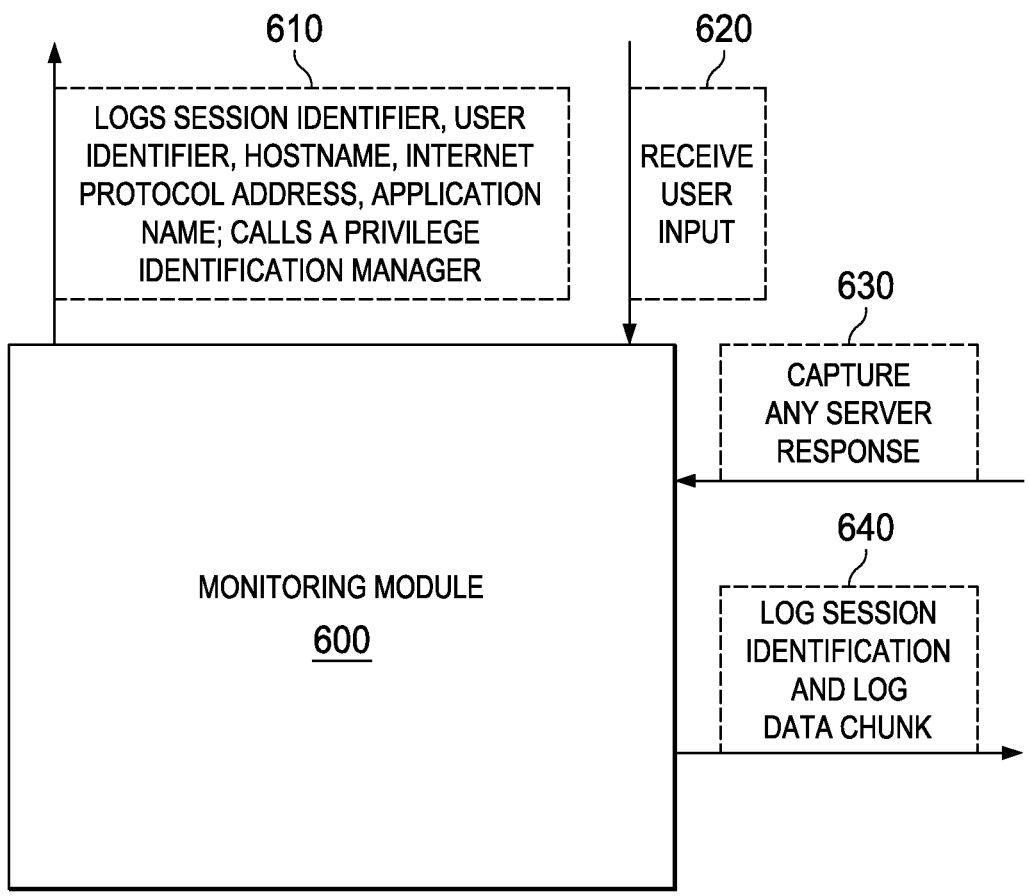
FIG. 6 is a data flow chart for command capturing within a monitoring module according to an illustrative embodiment.

Referring now to FIG. 6, a data flow chart for command capturing within a monitoring module is shown according to an illustrative embodiment. Monitoring module 600 is one of monitoring components 433 of FIG. 4.

Monitoring module 600 logs session identifier, user identifier, hostname, internet protocol address, application name calls a privilege identification manager (610).

Monitoring module receives user input (620), and then captures any server response (630). The server response can be sequentially captured into a same buffer as the user input.

Monitoring module then logs the session identifiers, along with the sequential user input and server response.

In one illustrative embodiment, the buffer is split into 500-byte chunks. The size is chosen due to a 512 byte of the description field in a user activity log table.

Monitoring module 600 logs session id, and log data chunk (640). If the privilege identification dies, monitoring module 600 terminates monitoring.

The session identifier identifies the specific cache entry for that user.

Figure 7:
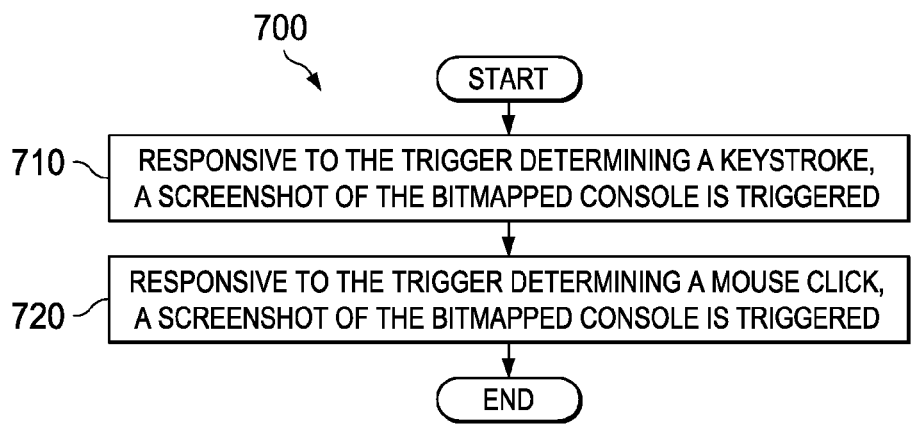
FIG. 7 is a flowchart for activity capturing in a bitmapped console according to an illustrative embodiment.

Referring now to FIG. 7, a flowchart for activity capturing in a bitmapped console is shown according to an illustrative embodiment. Process 700 is a software process, executing on a software component, such as in a command policy of an integrated management server system, such as integrated management server system 412 of FIG. 4. The command policy can be, for example, one of application specific workflow 420 or monitoring workflow 432 of FIG. 4.

Process 700 triggers a screenshot upon the occurrence of a trigger. The trigger can be, for example, one of triggers 441 of FIG. 4.

Responsive to the trigger determining a keystroke, a screenshot of the bitmapped console is triggered (step 710). The keystroke can be, for example, a depress of the "enter/return" key.

Responsive to the trigger determining a mouse click, a screenshot of the bitmapped console is triggered (step 720). Process 700 then returns to step 710 in an iterative manner log additional activities.

Figure 8:
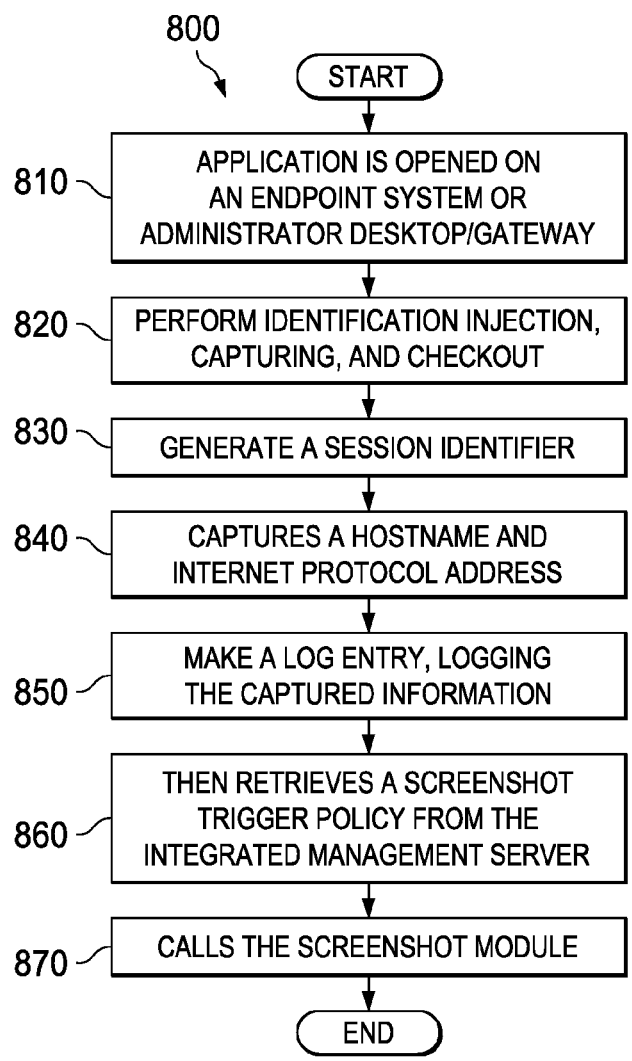
FIG. 8 is a flowchart for activity capturing in a bitmapped console according to an illustrative embodiment.

Referring now to FIG. 8, a flowchart for activity capturing in a bitmapped console is shown according to an illustrative embodiment. Process 800 is a software process, executing on a software component, such as in a profile of an integrated management server system, such as integrated management server system 412 of FIG. 4. The profile can be, for example, one of application specific workflow 420 or monitoring workflow 432 of FIG. 4. The profile can be a profile for a bitmapped console, such as a remote desktop profile.

Process 800 begins when an application is opened on an endpoint system or administrator desktop/gateway (step 810). The application can be, for example, one of applications 315 of FIG. 3. The endpoint system can be, for example, endpoint system 316 of FIG. 3. The administrator desktop/gateway can be, for example, administrator desktop/gateway 312 of FIG. 3.

Process 800 then performs identification injection, capturing, and checkout (step 820). Identification injection, capturing, and checkout is a process that retrieves any necessary user credentials that are required for access of an application, and applies those credentials to a checkout procedure. The credentials can be stored in a wallet, such as wallet 422 of FIG. 4.

Process 800 then generates a session identifier (step 830). The session identifier is a unique identifier that is sent with each request made by the logged on user.

Process 800 then captures a hostname and internet protocol address (step 840).

Process 800 then makes a log entry, logging the captured information (step 850). The logging information can be transferred as audit logs 448 of FIG. 4.

Process 800 then retrieves a screenshot trigger policy from the integrated management server (step 860). The screenshot trigger policy can be one of application policy 414 of FIG. 4 or monitoring policy 416 of FIG. 4.

For each trigger, process 800 calls the screenshot module (step 870), with the process terminating thereafter.

While FIG. 8 refers to calling the screenshot module, it is understood that the screenshot module can be incorporated into or combined with other modules. For example, the screenshot may be taken the detection module, such as the detection module described in FIG. 9. Furthermore, it is understood that the capture may be constrained by some conditions, such as, for example but not limited to, that a screenshot of should be taken only if only if certain windows are visible on a user's desktop.

Figure 9:
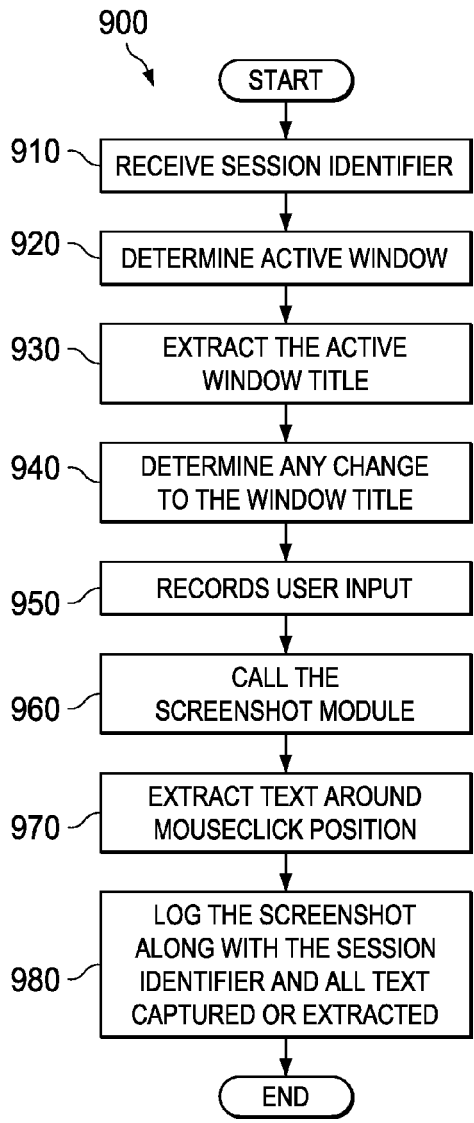
FIG. 9 is flowchart of a process for capturing activity in a bitmapped console according to an illustrative embodiment.

Referring now to FIG. 9, a flowchart of a process for capturing activity in a bitmapped console is shown according to an illustrative embodiment. Process 900 is a software process, executing on a software component, such as monitoring module 432 of FIG. 4.

Process 900 begins when a session identifier is received (step 910). The session identifier can be received in response to the name of the Remote Desktop's address.

Process 900 determines the active window (step 920). An active window is the currently focused window in the current window manager or explorer. The active window can be the window that is currently being used by the user.

Process 900 extracts the active window title (step 930). The window title for the active window is text that appears within a title bar at the top of the active window.

Process 900 determines any change to the window title (step 940). Changes to the window title can be determined by performing optical character recognition to the title bar of the active window, and comparing detected text to previous recognized window.

Process 900 then records user input (step 950). User input can be for example but not limited to, key strokes and mouse clicks.

Process 900 then calls the screenshot module (step 960). Process 900 and extracts any text around a mouse click position (step 970).

Process 900 then logs the screenshot along with the session identifier, as well as all captured text and extracted text (step 980), with the process terminating thereafter.

Figure 10:
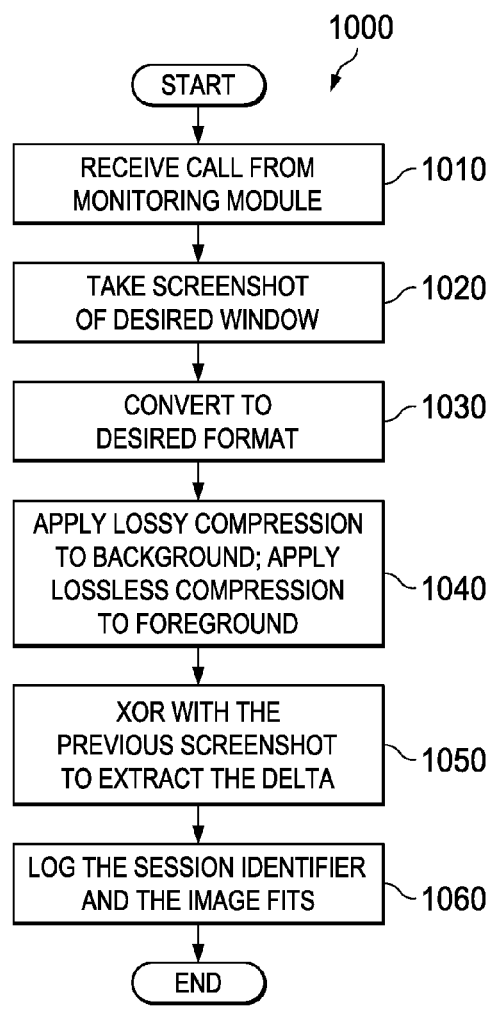
FIG. 10 is a flowchart of a process for capturing activity in a bitmapped console for a screenshot module according to an illustrative embodiment.

Referring now to FIG. 10, a flowchart of a process for capturing activity in a bitmapped console for a screenshot module is shown according to an illustrative embodiment. Process 1000 is a software process, executing on a software component, such as monitoring module 432 of FIG. 4.

Process 1000 begins by receiving a call from another monitoring module (step 1010). The call can be, for example a call such as the call of step 870 of FIG. 8. The call can include a session identifier for the triggered application.

Process 1000 takes a screenshot of the desired window (step 1020). The desired window is the graphical user interface into which a user action was entered, and detected. The desired can be, for example the active window. For example, the screenshot can include the entire remote desktop profile.

Process 1000 converts and compresses the screenshot into a storage format (step 1030). In one illustrative embodiment, the storage format can be, for example, but not limited to, a binary format.

Process 1000 then applies a data encoding compression to the screenshot (step 1040). According to one illustrative embodiment, a lossy compression can be applied to a background of the screenshot, while a lossless compression is applied to the foreground. The foreground of the screenshot can include, for example but not limited to, the active window. The background of the screenshot can include, for example but not limited to, other windows or icons visible within the screenshot not including the active window. Lossless compression use data compression algorithms that allows for exact reconstruction of the foreground from compressed data. However, lossy compression does not produce an exact reconstruction of the background from the compressed data.

Process 1000 then performs an XOR operation with a preview screenshot to extract a delta between the two screenshot (step 1050).

Process 1000 then log the session identifier and image fits (step 1060), with the process terminating thereafter. The image fits include at least the delta file.

Figure 11:
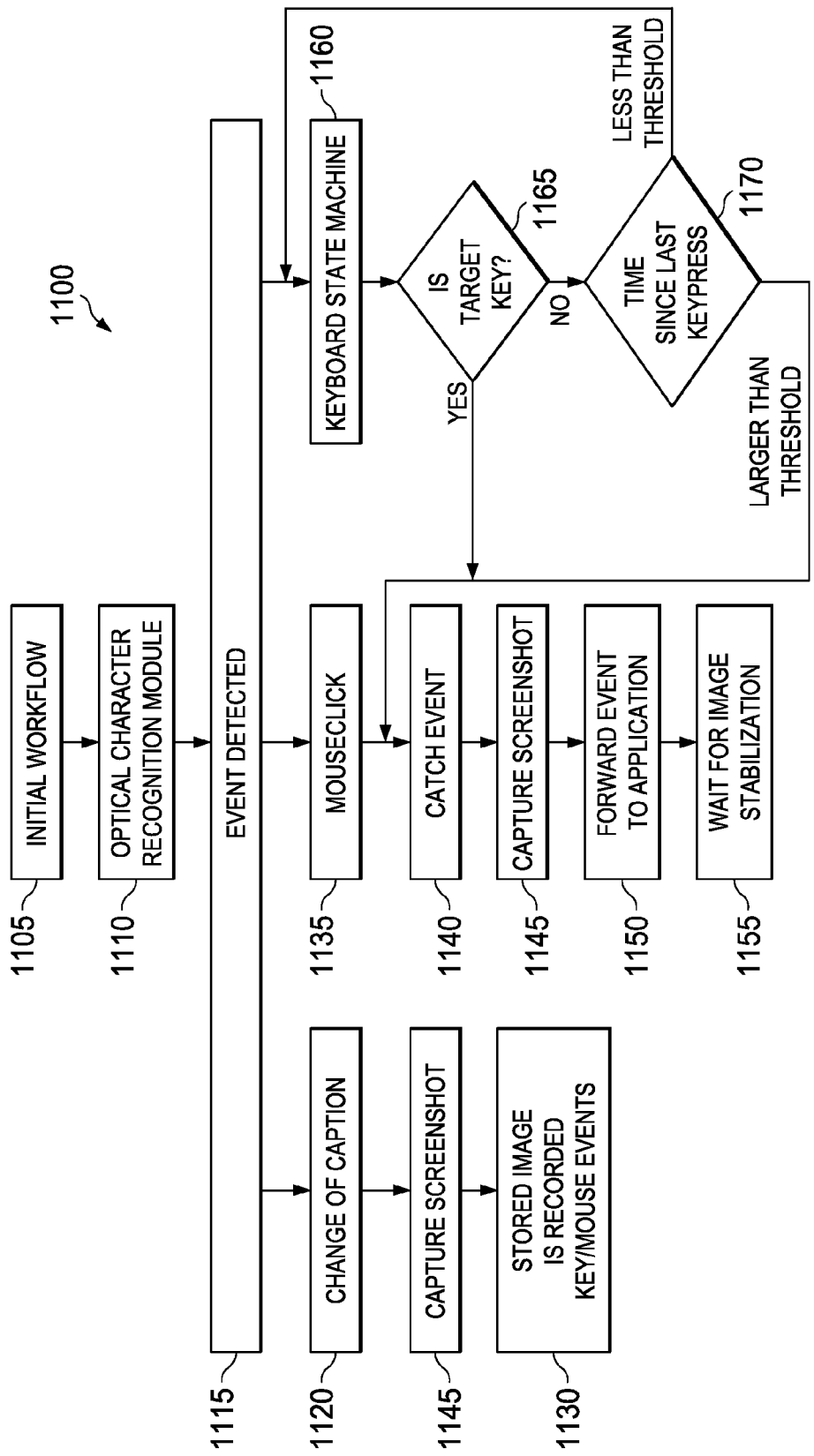
FIG. 11 is flowchart for obtaining an event driven screenshot according to an illustrative embodiment.

Referring now to FIG. 11, a flowchart for is an event driven screenshot is shown according to an illustrative embodiment.

Process 1100 begins by receiving an initial workflow (step 1105). The initial workflow is application specific workflow 420 or monitoring workflow 432 of FIG. 4.

Responsive to receiving the initial workflow, process 1100 forwards the initial workflow to an optical character recognition module (step 1110) and begins monitoring by following the visual activity of the screen image and/or the user's use of mouse and keyboard. In one illustrative embodiment, the detection of mouse clicks and keyboard events is performed externally from VOP, such as for example, but not limited to, by an application such as IBM Tivoli Access Manager for Enterprise Single Sign-On (TAMESSO).

Process 1100 then detects an event (step 1115). The event can be detected by the triggering of a trigger, such as one of triggers 441 of FIG. 4.

In response to the event being a change to a change of caption (step 1120), process 1100 captures a screenshot (step 1125). The screenshot can be captured according to process 1000 of FIG. 10.

Responsive to capturing the screenshot, process 1100 logs the session id, and any recorded keystroke or mouse events (step 1030), with the process terminating thereafter. The session id and the recorded keystroke or mouse events can be logged as audit logs 448 of FIG. 4.

Returning now to step 1115, responsive to the event being a mouse click (step 1135), process 1100 captures the event (step 1140). By capturing the mouse click event, process 1100 stores the metadata associated with the event, such as for example but not limited to, a kind of the mouse click, a position of the pointer, and a button identification that is utilized for the click.

Process 1145 then captures a screenshot (step 1145). The screenshot can be captured according to process 1000 of FIG. 10.

Process 1100 forwards the event to the monitored application (step 1150). In one illustrative embodiment, the mouse monitoring adds a set of hooks to mouse handling chain of the operating system. When a mouse event is triggered, the "hook" captures or does something with the event, for example reads metadata associated with the mouse event. The hook then releases the event back to the event chain. In this manner the monitoring will not interfere the processing, just delay it marginally.

Process 1100 waits for image stabilization (step 1155), as described above. Waiting for "Image stabilization" means waiting for certain processes to complete. When a screen image is updated, the image does not usually refresh instantly, but rather refreshes in a sweeping manner. Furthermore, sometimes a graphical user interface might take some time to load it graphics. Some content is shown immediately, for example but not limited to menus, while other content takes some time to be retrieved. By waiting for "Image stabilization," process 1100 waits for the whole screen image or part of the screen image not to change any more.

Returning now to step 1115, responsive to the event being a change to the keyboard state machine (step 1160), process 1100 determines if the change to the state machine was due to a keystroke of a target key (step 1165). The keystroke of a target key can be, for example, a depress of the "enter/return" key. Responsive to determining that change to the state machine was due to a keystroke of a target key ("yes" at step 1165), process 1100 proceeds to step 1140 to capture the event.

Responsive to determining that change to the state machine was not due to a keystroke of a target key ("no" at step 1165), process 1100 then determines whether a predetermined time has passed since the last key press (step 1170). Responsive to determining that the time passed since the last key press is less than some predetermined ("less than threshold" at step 1170), process 1100 iterates back to step 1160.

Responsive to determining that the time passed since the last key press is larger than some predetermined ("larger than threshold" at step 1170), process 1100 proceeds to proceeds to step 1140 to capture the event.

Figure 12:
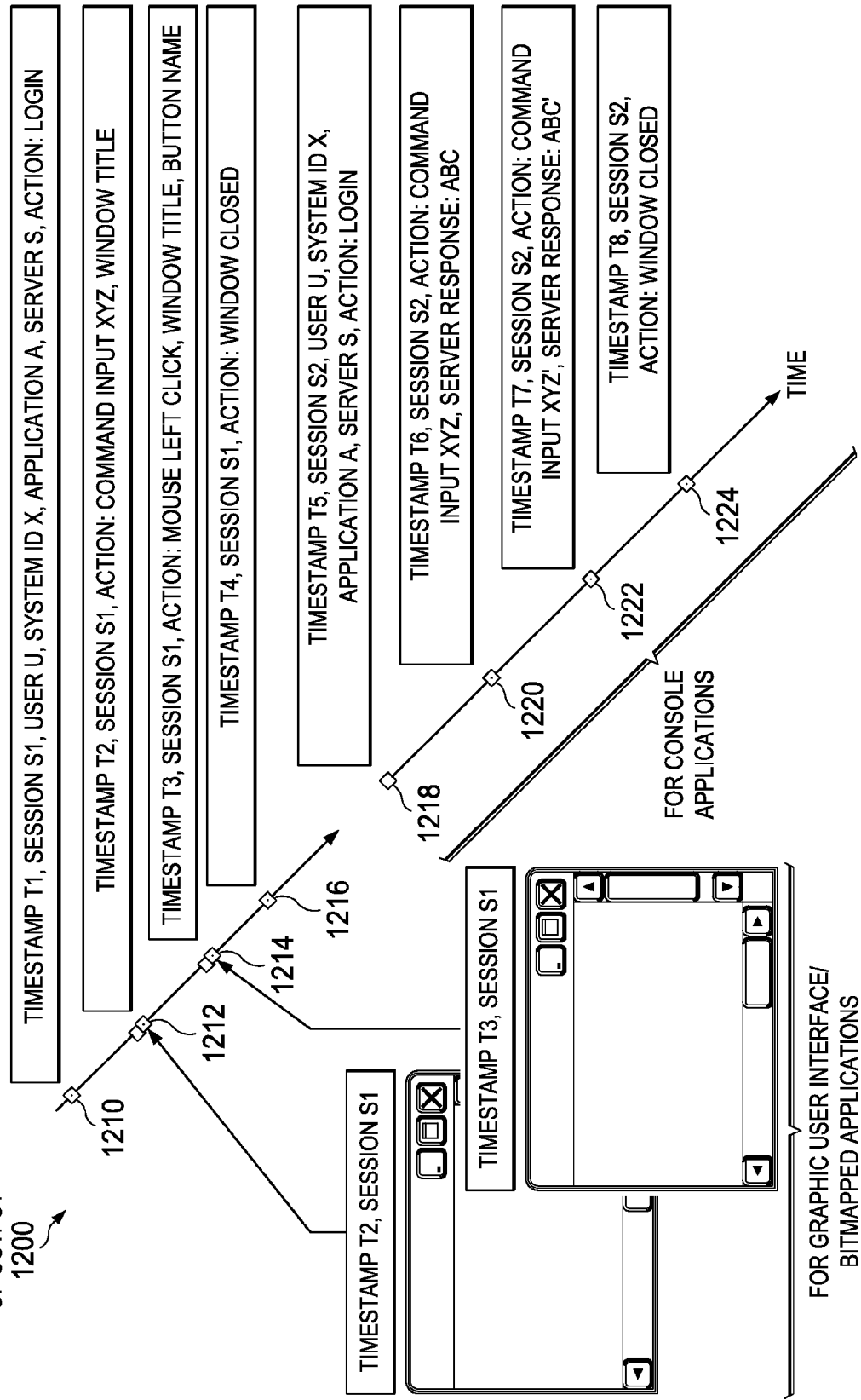
FIG. 12 is an illustration of a series of audit logs according to an illustrative embodiment.

Referring now to FIG. 12, an illustration of a series of audit logs is shown according to an illustrative embodiment. Audit logs 1200 are audit logs such as audit logs 448 of FIG. 4.

Audit logs 1210-1216 are audit logs of graphical user interface and bitmapped applications. The console applications can be applications such as applications 315 of FIG. 3.

Audit log 1210 is an audit log taken at time indicated by timestamp T1. Audit log 1210 includes a session identifier, a user identifier, a system identifier, an application identifier, and a server identifier. This information can be captured by monitoring components, such as Monitoring components 433 of FIG. 4. Additionally, audit log 1210 includes an indication of the action triggering the audit log. Here, a login action by user U triggers audit log 1210.

Audit log 1212 is an audit log taken at time indicated by timestamp T2. Audit log 1212 includes a session identifier. This information can be captured by monitoring components, such as monitoring components 433 of FIG. 4. Additionally, audit log 1212 includes an indication of the action triggering the audit log. Here, a command input into "window title" of "xyz" by user U triggers audit log 1212.

Audit log 1212 also includes a screenshot of "window title" at time indicated by timestamp T2. The screenshot can be determined, for example, by process 1000 of FIG. 10.

Audit log 1214 is an audit log taken at time indicated by timestamp T3. Audit log 1214 includes a session identifier. This information can be captured by monitoring components, such as Monitoring components 433 of FIG. 4. Additionally, audit log 1214 includes an indication of the action triggering the audit log. Here, a "left mouse click" of "button name" within "window title" by user U triggers audit log 1214.

Audit log 1214 also includes a screenshot of "window title" at time indicated by timestamp T32. The screenshot can be determined, for example, by process 1000 of FIG. 10.

Audit log 1216 is an audit log taken at time indicated by timestamp T4. Audit log 1216 includes a session identifier. This information can be captured by monitoring compo-nents, such as Monitoring components 433 of FIG. 4. Additionally, audit log 1216 includes an indication of the action triggering the audit log. Here, a close of window of the monitored application triggers audit log 1216.

Audit logs 1218-1224 are audit logs of console applications. The console applications can be applications such as applications 315 of FIG. 5.

Audit log 1218 is an audit log taken at time indicated by timestamp T5. Audit log 1218 includes a session identifier, a user identifier, a system identifier, an application identifier, and a server identifier. This information can be captured by monitoring components, such as monitoring components 433 of FIG. 4. Additionally, audit log 1218 includes an indication of the action triggering the audit log. Here, a login action by user U triggers audit log 1218.

Audit log 1220 is an audit log taken at time indicated by timestamp T6. Audit log 1220 includes a session identifier. This information can be captured by monitoring components, such as monitoring components 433 of FIG. 4. Additionally, audit log 1220 includes an indication of the action triggering the audit log and any server response. Here, a command of "xyz" by user U and a server response of "abc" triggers audit log 1220.

Audit log 1222 is an audit log taken at time indicated by timestamp T7. Audit log 1222 includes a session identifier. This information can be captured by monitoring components, such as monitoring components 433 of FIG. 4. Additionally, audit log 1222 includes an indication of the action triggering the audit log and any server response. Here, a command of "xyz" by user U and a server response of "abc" triggers audit log 1222.

Audit log 1224 is an audit log taken at time indicated by timestamp T8. Audit log 1224 includes a session identifier. This information can be captured by monitoring components, such as monitoring components 433 of FIG. 4. Additionally, audit log 1224 includes an indication of the action triggering the audit log. Here, a close of window of the monitored application triggers audit log 1216.

Figure 13:
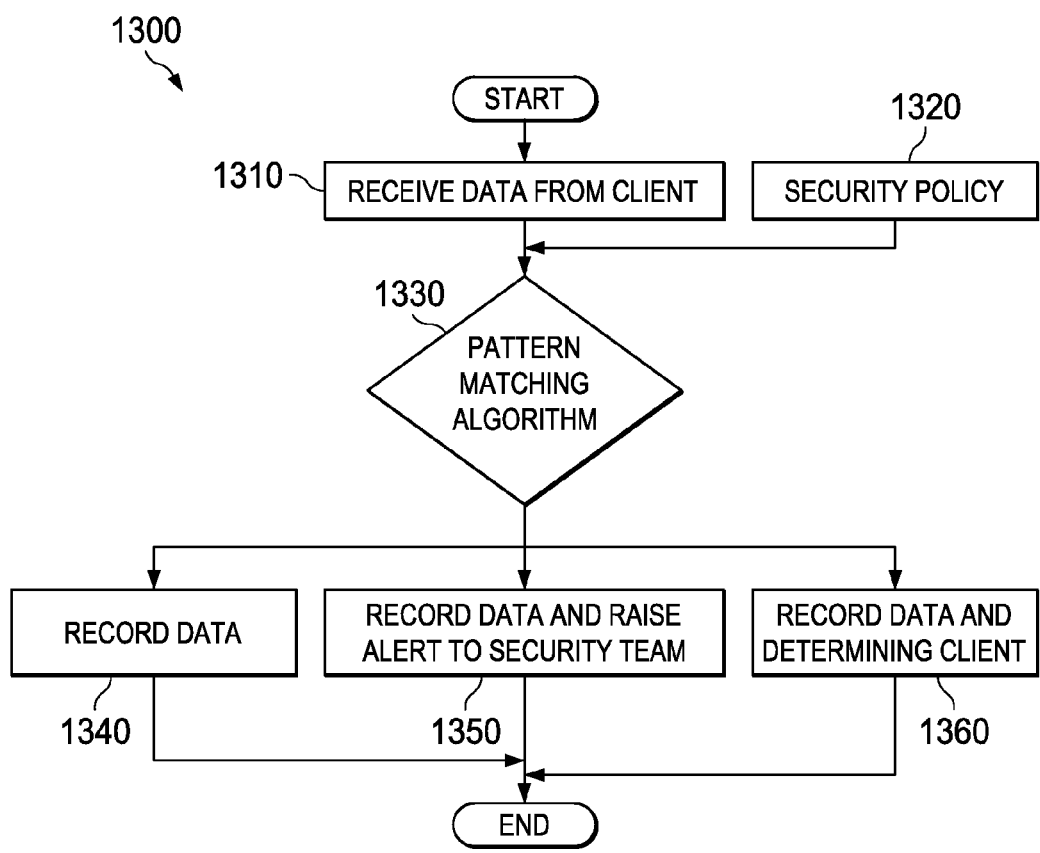
FIG. 13 a flow chart for applying a policy to recorded event is shown according to an illustrative embodiment.

Referring now to FIG. 13, a flow chart for applying a policy to recorded event is shown according to an illustrative embodiment. Process 1300 is a software process, executing on a software component, such as application specific workflow 420 of FIG. 4.

Process 1300 begins by receiving data from a client (step 1310). The data can include, for example, a screenshot along with any associated mouse event or keyboard event.

Process 1300 then retrieves a security policy (step 1320). The security policy can be, for example, a policy such as application policy 414 and monitoring policy 416.

Process 1300 then determines applies a pattern-matching algorithm to the data received from the client, according to security policy (step 1330). Based on results from the pattern matching algorithm, process 1300 can record the data (step 1340), record the data and raise alert to security team (step 1350), or record the data and terminate the client (step 1360). Process 1300 terminates thereafter.

Thus, the illustrative embodiments herein provide a system for user activity capturing and monitoring services. The invention has a server-client architecture. The client side consists of an agent which performs single sign-on actions for corresponding applications, and a few monitoring modules which are exported as dynamic link library application program interfaces. Each application workflow, determines the right interface and right step to perform single sign-on, and calls individual monitoring modules to perform monitoring actions based on the nature of the application. Activities such as user login, logout are logged on server audit log database by default. Each activity monitored by the modules is also logged in the database with each session differentiated by a session identifiers.

Activities such as Secure Shell are captured when the command is entered. A separate session identifiers is assigned to the Secure Shell session to differentiate it from the parent session. Multiple Secure Shell sessions or nested Secure Shell sessions can be differentiated.

For graphical user interface applications, such as Tool for Oracle Application Developers (TOAD) for database access, Remote Desktop Protocol for remote Windows server access, activity logs are linked with window title, keystrokes, mouse clicks and critical screenshots. This is achieved via an event-driven snapshot taking mechanism which ensures high performance and low storage size. The resulted log is also searchable via title or command text.

Thus, illustrative embodiments of the present invention provide a computer implemented method, data processing system, and computer program product for controlling point in time access to a remote client device and auditing system logs of the remote client device by an auditing server device to determine whether monitored user activity on the remote client device associated with a work request was in compliance with one or more regulations. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain best the principles of the invention and the practical application, and to enable others of ordinary skill in the art to understand the invention for various embodiments with various modifications as are suited to the particular use contemplated.

What is claimed is:

1. A computer program product for capturing and monitoring user activity, the computer program product comprising:
   a non-transitory computer readable storage medium having computer readable program code embodied therewith that is executable by a computer, the computer readable program code comprising:
   computer readable program code configured to identify a monitored event by a workflow for a supported application, wherein the workflow performs workflow automation for the supported application in response to initiation of the supported application;

computer readable program code, responsive to identifying the monitored event, configured to capture information about the monitored event, wherein the information captured about the monitored event includes a server response to the monitored event;
computer readable program code configured to wait for image stabilization of a whole screen image to finish loading before capturing a screenshot of the supported application;
computer readable program code, responsive to the image stabilization of the whole screen image after finishing loading, configured to capture the screenshot of the supported application;
computer readable program code configured to apply a lossless data compression to a foreground of the screenshot that includes an active window of the supported application and apply a lossy data compression to a background of the screenshot that includes other windows and icons visible in the screenshot but excludes the active window;
computer readable program code configured to associate the information with the screenshot; and
computer readable program code configured to store the associated information and the screenshot as an audit log of the monitored event;
wherein the computer includes a client side agent that is a client side software system that communicates with and performs tasks to synchronize data changes with an integrated management system server, and wherein the workflow is one of an application specific workflow that uses an application policy that defines which user commands are blocked and allowed, or a monitoring workflow that uses a monitoring policy that defines which user activities are stored in the audit log of the monitored event.

2. The computer program product of claim 1, wherein the client side agent includes plug-ins, the computer program product further comprising:
computer readable program code configured to perform a custom action needed as part of a workflow trigger or workflow action inside the application specific workflow; and
computer readable program code configured to make calls into an operating system or other ones of the plug-ins to implement customized authentication, access control, and the workflow automation for the supported application.

3. The computer program product of claim 1, wherein the monitored event is a state change detected by the workflow, the state change selected from a group comprising a change to a position of a current active window event, a change to a title of the current active window event, a mouse event, and a keyboard event.

4. The computer program product of claim 1, wherein the information is identified by a set of application programming interface applications that log event messages to an integrated management system server, the set of application programming interface applications being selected from a group comprising a bitmap recognition module comprising an optical character recognition module to capture bit-mapped application processes, a screen capturing module to dynamically capture the screenshot of the supported application based on user input that causes a state change within the workflow, and a graphical user interface module to dynamically capture an activity signature, the activity signature comprising a window title of a current active application and a button name that is interacted with in a graphical user interface.

5. The computer program product of claim 1, further comprising:
computer readable program code configured to forward the audit log to an integrated management system server to determine that the audit log of the monitored event is in compliance with a federal regulation corresponding to the supported application providing a federally regulated service; and
computer readable program code configured to store the audit log at the integrated management system server.

6. A computer comprising:
a storage device having computer readable program code for capturing and monitoring user activity embodied therewith; and
a bus connecting the storage device to a processor, wherein the processor executes the computer readable program code:
to identify a monitored event by a workflow for a supported application, wherein the workflow performs workflow automation for the supported application in response to initiation of the supported application;
responsive to identifying the monitored event, to capture information about the monitored event, wherein the information captured about the monitored event includes a server response to the monitored event;
to wait for image stabilization of a whole screen image to finish loading before capturing a screenshot of the supported application;
responsive to the image stabilization of the whole screen image after finishing loading, to capture the screenshot of the supported application;
to apply a lossless data compression to a foreground of the screenshot that includes an active window of the supported application and apply a lossy data compression to a background of the screenshot that includes other windows and icons visible in the screenshot but excludes the active window;
to associate the information with the screenshot; and
to store the associated information and the screenshot as an audit log of the monitored event;
wherein the computer includes a client side agent that is a client side software system that communicates with and performs tasks to synchronize data changes with an integrated management system server, and wherein the workflow is one of an application specific workflow that uses an application policy that defines which user commands are blocked and allowed, or a monitoring workflow that uses a monitoring policy that defines which user activities are stored in the audit log of the monitored event.

7. The computer of claim 6, wherein the client side agent includes plug-ins, wherein the processor further executes the computer readable program code:
to perform custom action needed as part of a workflow trigger or workflow action inside the application specific workflow; and
to make calls into an operating system or other ones of the plug-ins to implement customized authentication, access control, and the workflow automation for the supported application.

8. The computer of claim 6, wherein the monitored event is a state change detected by the workflow, the state change selected from a group comprising a change to a position of a current active window event, a change to a title of the current active window event, a mouse event, and a keyboard event.

9. The computer of claim 6, wherein the information is identified by a set of application programming interface applications that log event messages to an integrated management system server, the set of application programming interface applications being selected from a group comprising a bitmap recognition module comprising an optical character recognition module to capture bit-mapped application processes, a screen capturing module to dynamically capture the screenshot of the supported application based on user input that causes a state change within the workflow, and a graphical user interface module to dynamically capture an activity signature, the activity signature comprising a window title of a current active application and a button name that is interacted with in a graphical user interface.

10. The computer of claim 6, wherein the processor further executes the computer readable program code:

to forward the audit log to an integrated management system server to determine that the audit log of the monitored event is in compliance with a federal regulation corresponding to the supported application providing a federally regulated service; and to store the audit log at the integrated management system server.

11. The computer program product of claim 1, wherein the associated information and the screenshot is stored as the audit log by a monitoring module called by the workflow.

12. The computer program product of claim 11, where the monitoring module is exported as a dynamic link library application program interface.

13. The computer program product of claim 1, wherein the workflow comprises instructions for performing automatic operations for user logon and user logoff.

14. The computer program product of claim 1, wherein the audit log comprises the server response to the monitored event and an indication of an action triggering the audit log.

* * * * *